United States Patent
Klepp et al.

(10) Patent No.: US 9,969,421 B2
(45) Date of Patent: May 15, 2018

(54) ENERGY ABSORPTION DEVICE FOR A STEERING COLUMN

(71) Applicant: THYSSENKRUPP PRESTA AG, Eschen (LI)

(72) Inventors: Arne Klepp, Feldkirch (AT); Hansjörg Sulser, Gamprin (LI); Felipe Segatto, Chur (CH); Sebastian Forte, Mauren (LI)

(73) Assignee: THYSSENKRUPP PRESTA AG, Eschen (LI)

( * ) Notice: Subject to any disclaimer, the term of this patent is extended or adjusted under 35 U.S.C. 154(b) by 435 days.

(21) Appl. No.: 14/889,806

(22) PCT Filed: Mar. 24, 2014

(86) PCT No.: PCT/EP2014/000794
§ 371 (c)(1),
(2) Date: Nov. 6, 2015

(87) PCT Pub. No.: WO2014/183819
PCT Pub. Date: Nov. 20, 2014

(65) Prior Publication Data
US 2016/0121920 A1 May 5, 2016

(30) Foreign Application Priority Data
May 14, 2013 (DE) .................. 10 2013 104 958

(51) Int. Cl.
*B62D 1/19* (2006.01)
(52) U.S. Cl.
CPC ..................... *B62D 1/195* (2013.01)
(58) Field of Classification Search
CPC .................. B62D 1/195; B62D 1/192
See application file for complete search history.

(56) References Cited

U.S. PATENT DOCUMENTS 5,562,307 A * 10/1996 Connor .................. B62D 1/195
  188/371
5,820,163 A * 10/1998 Thacker ................. B62D 1/184
  280/775

(Continued)

FOREIGN PATENT DOCUMENTS

CN   101300163 A    11/2008
DE   102008034807 B3  10/2009
(Continued)

OTHER PUBLICATIONS

International Search Report for International Patent Application No. PCT/EP2014/000794; dated Jun. 23, 2014.
English language Abstract for CN 101300163 A.

*Primary Examiner* — Ruth Ilan
(74) *Attorney, Agent, or Firm* — thyssenkrupp North America, Inc.

(57) ABSTRACT

An energy absorption device for a steering column for a motor vehicle may include a bending bracket for energy absorption in a crash event. The bending bracket may comprise a first fastening element and a second fastening element, with the first fastening element being displaceable relative to the second fastening element if, in a crash event, the bending bracket is deformed along a guide track delimited by a start and an end. The energy absorption device may further include one or more collision elements arranged on the guide track. An example collision element may interact with the first fastening element or an element on a retaining part that is secured to the first fastening element such that the collision element, the first fastening element, and/or the element on the retaining part are deformed and absorb additional energy.

10 Claims, 4 Drawing Sheets

(56) References Cited

U.S. PATENT DOCUMENTS

| | | | |
|---|---|---|---|
| 5,961,146 A | 10/1999 | Matsumoto et al. | |
| 8,474,869 B2* | 7/2013 | Sulser | B62D 1/184 |
| | | | 280/775 |
| 2008/0229867 A1* | 9/2008 | Waibel | B62D 1/184 |
| | | | 74/493 |
| 2011/0115206 A1* | 5/2011 | Sulser | B62D 1/184 |
| | | | 280/775 |
| 2012/0024101 A1* | 2/2012 | Schnitzer | B62D 1/195 |
| | | | 74/492 |

FOREIGN PATENT DOCUMENTS

| | | |
|---|---|---|
| DE | 102012100626 B3 | 2/2013 |
| WO | 2011/072311 A1 | 6/2011 |

* cited by examiner

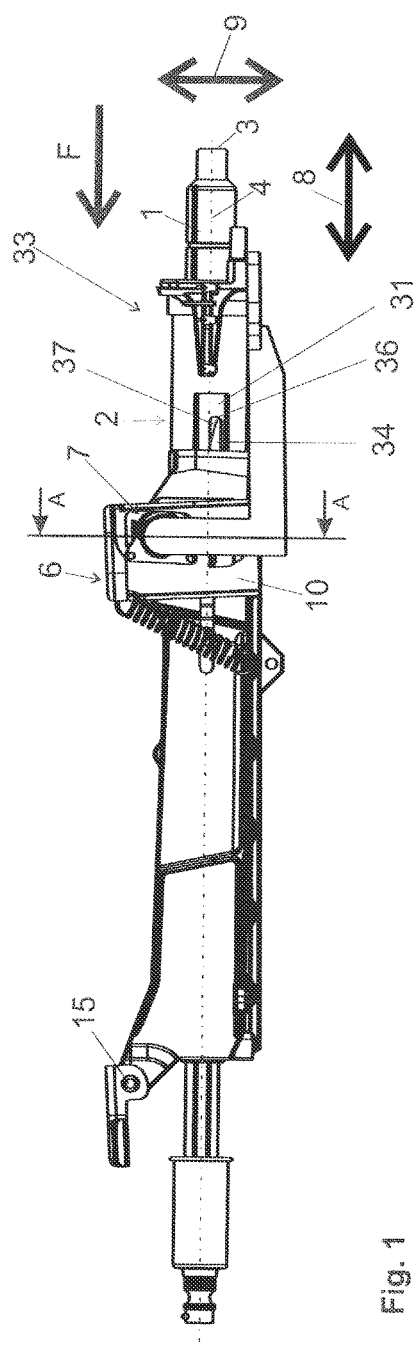
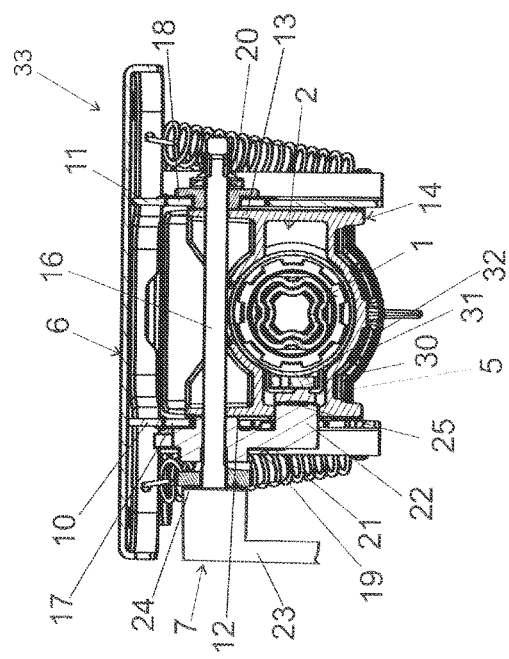
Fig. 1
Fig. 2

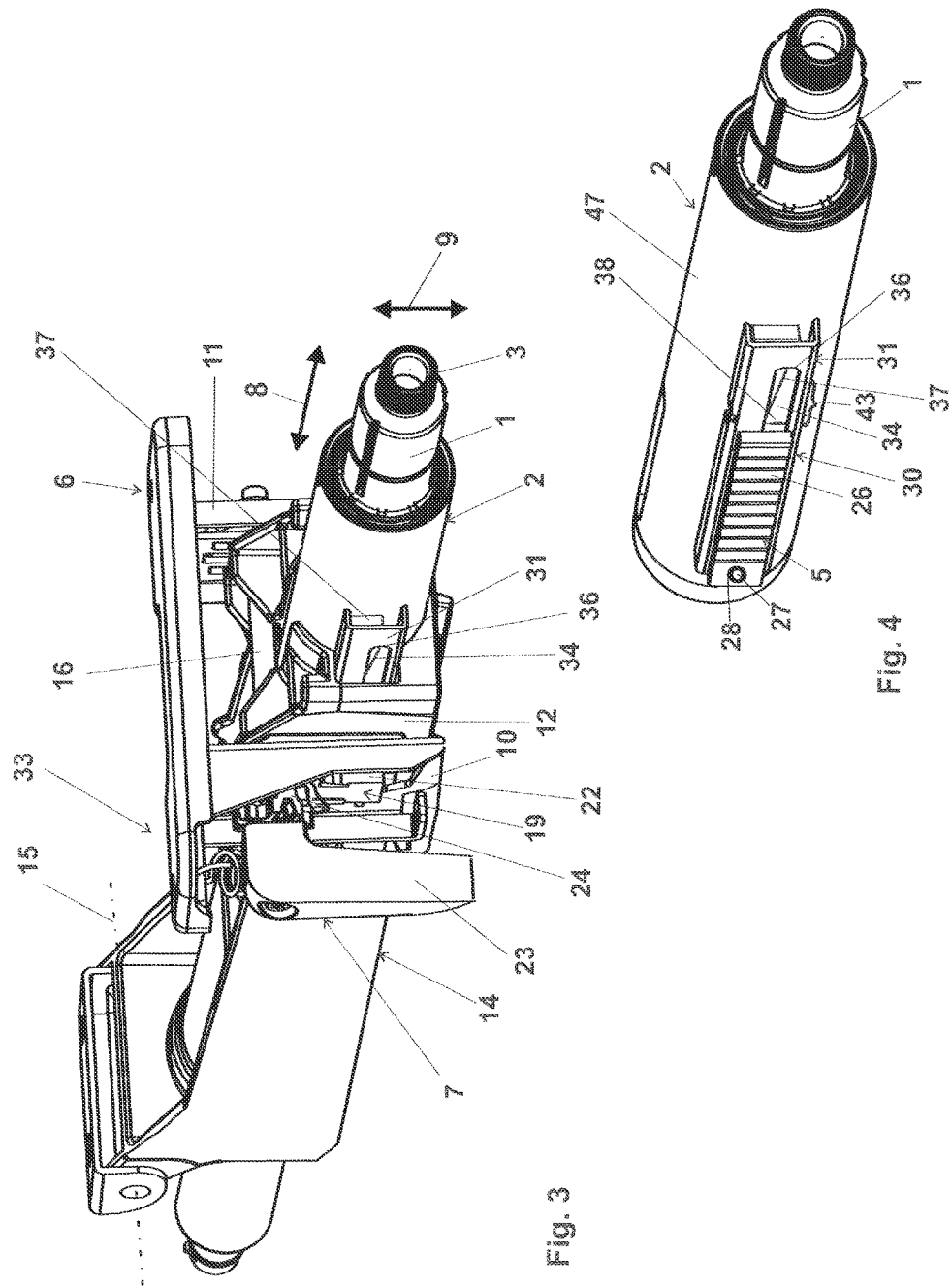

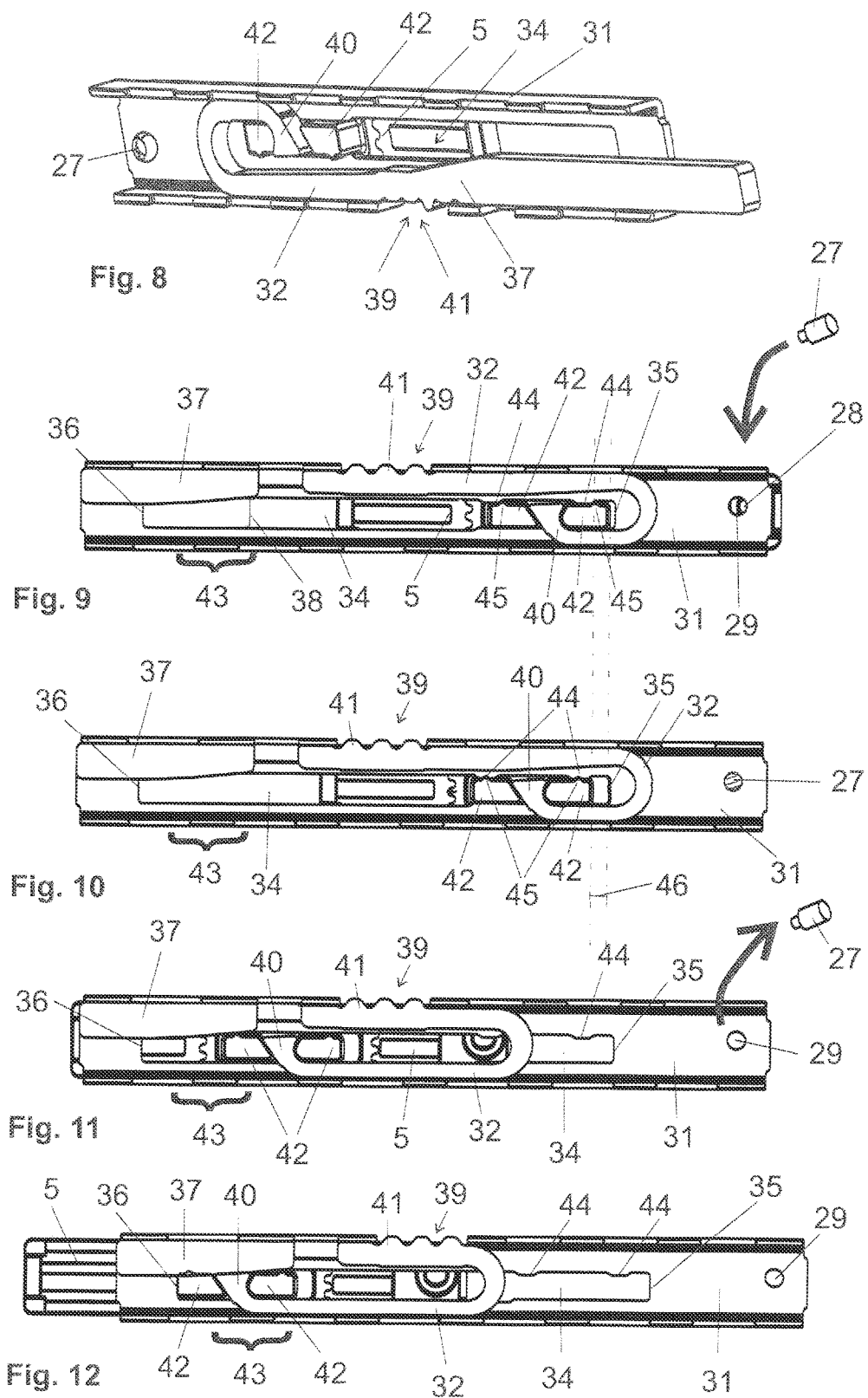

ENERGY ABSORPTION DEVICE FOR A STEERING COLUMN

CROSS REFERENCE TO RELATED APPLICATIONS

This application is a U.S. National Stage Entry of International Patent Application Serial Number PCT/EP2014/000794, filed Apr. 24, 2014, which claims priority to German patent application no. DE 102013104958.3 filed May 14, 2013, the entire contents of both of which are incorporated herein by reference.

FIELD

The present disclosure relates to an energy absorption device for a steering column for a motor vehicle and to a method for absorbing energy in a steering column for a motor vehicle in a crash event.

BACKGROUND

Summary

Energy absorption devices are used in steering columns for motor vehicles in order, in a crash situation, that is to say in the event of a collision between the motor vehicle and another motor vehicle or some other object, to targetedly dissipate the energy associated with the impact of the vehicle driver against the steering wheel and thus the steering column, such that the vehicle driver, who is flung against the steering wheel, is as far as possible not injured, or is at least injured to the least possible extent. Energy absorption devices of the type mentioned in the introduction are known in numerous embodiments in the prior art. They have in common the fact that, for the targeted dissipation, in a manner compatible with the vehicle driver, of the impact energy arising in a crash situation, at least one bending bracket of the energy absorption device is deformed when the first fastening element is displaced along the guide track relative to the second fastening element.

A generic energy absorption device is known for example from WO 2011/072311 A1. It is provided in said document that the bending bracket is preloaded in order to avoid a force peak at the start of the energy absorption process.

A similar energy absorption device for a steering column having a bending bracket is also presented in DE 10 2008 034 807.

Practice has shown that, with the hitherto known technology, problems with regard to excessive force peaks may arise not only at the start of the energy absorption process, as discussed in WO 2011/072311 A1, but also during the energy absorption process or at the end thereof. Said problem arises in particular if relatively heavy vehicle drivers are flung against the steering wheel of the motor vehicle in a crash situation. In particular, a situation may arise here in which the first bending bracket abuts against the end of the guide track without the impact energy that arises in the crash situation having been sufficiently dissipated up until that point. When the first fastening element abuts against the end of the guide track, undesirably high force peaks can arise.

It is therefore an object of the invention to improve an energy absorption device of the type mentioned in the introduction, such that the energy absorption process can be influenced not only by way of the configuration of the bending bracket.

In one example, an energy absorption device for a steering column for a motor vehicle may include at least one bending bracket for energy absorption in a crash situation. The bending bracket may have a first fastening element for the fastening of the bending bracket to a first component of the steering column and at least one second fastening element for the fastening of the bending bracket to a second component of the steering column. For reasons of and forces experienced during a crash event, the first fastening element may be, mounted so as to be displaceable relative to the second fastening element, with deformation of the bending bracket, along a guide track which is delimited by a start and an end. The present disclosure also relates to a steering column for a motor vehicle and to a method for absorbing energy in a steering column for a motor vehicle in a crash event.

It is thus provided that the energy absorption device has, in addition to the end of the guide track, at least one collision element which is arranged on the guide track, wherein, in a crash situation, by interaction of the first fastening element, and/or of an element which is moved concomitantly with said first fastening element along the guide track, with the collision element, energy can additionally be absorbed by deformation of the collision element and/or of the first fastening element and/or of the concomitantly moved element.

A basic concept of the invention thus consists in that, in addition to the bending bracket, a second energy absorption process is provided which involves at least one collision element which, in a crash situation, interacts with the first fastening element, and/or with an element that is moved concomitantly therewith along the guide track, with deformation of one of the stated elements such that additional energy is dissipated or absorbed. Said collision element is provided in addition to the end of the guide track, such that, in a crash situation, the stated interaction, and thus the additional dissipation of the impact energy, preferably occurs before an undesired force peak arises as a result of the end of the guide track being reached. In this context, it is expedient if the collision element is arranged between the start and the end of the guide track. Here, preferred embodiments provide that the collision element is arranged in the region of that half of the guide track which faces the end, that is to say, so to speak, in the second half of the guide track. In these embodiments, it is then possible, in a crash situation, for initially only the bending bracket alone to act so as to absorb energy. If this is then not sufficient for the dissipation of the impact energy, the second energy absorption mechanism with the collision element ensures a targeted dissipation, which is compatible with the vehicle driver, of the rest of the impact energy still in the system. In this way, an impact of the first fastening element and/or of the concomitantly moved element at the end of the guide track is expediently prevented. In this context, it is however pointed out that additional energy absorption mechanisms with a collision element, according to the invention, may be used not only at the end but also anywhere along the guide track in order to targetedly influence the dissipation of the impact energy.

It is basically possible for one or even more collision elements to be positioned along the guide track. Said collision elements may even be delimited in punctiform fashion and act only at one particular location along the guide track. The collision elements can be deformed or else, as it were as a special deformation case, may be in the form of breakaway elements. Thus, in one embodiment, a breakaway may be regarded as a deformation.

For a soft dissipation of energy, preferred embodiments of the invention provide that the collision elements act not only in punctiform fashion but along a partial extent of the guide track, that is to say over a relatively long section of the overall energy absorption process. In this context, it is expedient if the collision element extends at least along a partial extent of the guide track and, in a crash situation, by the interaction of the first fastening element, and/or of the element which is moved concomitantly with said first fastening element along the guide track, with the collision element, energy can additionally be absorbed by deformation of the collision element and/or of the first fastening element and/or of the concomitantly moved element along the partial extent.

By means of the configuration of the length and of the form of the collision element, of the first fastening element and/or of the one or more elements moved concomitantly with said first fastening element, it is possible to targetedly influence the profile of the energy absorption process. By means of corresponding embodiments of the stated elements, it is thus possible to targetedly influence how much energy is dissipated, and at what location or at what time this occurs within the overall energy absorption process. In other words, it is thus possible for energy dissipation profiles to be generated in targeted fashion. In this context, it is expedient if the intensity of the energy absorption varies along the partial extent. Here, it is particularly preferably provided that the intensity of the energy absorption increases along the partial extent in the direction toward the end of the guide tracks. It may be provided, for example, that the collision element has, or is designed as, at least one wedge-shaped region. Here, preferred embodiments provide that the collision element, by way of its wedge-shaped region, reduces the opening width of the slot to be passed through by the first fastening element and/or the concomitantly moved element. In general, it is expedient if the guide track is a slot. Here, preferred embodiments of the invention provide that the first fastening element and/or the concomitantly moved elements extend(s) through the slot and are or is displaceable along the slot in a crash situation. To effectively reduce the opening width of the slot to be passed through by the first fastening element and/or the concomitantly moved element, the collision element need not imperatively lie in the plane of the guide track or of the slot. This is the case in particular if the first fastening element and/or the one or more concomitantly moved elements protrude out of the slot or beyond some other guide track.

As already discussed, the collision element may be shaped in different ways in order to provide targeted profiles of the intensity of the energy absorption. Furthermore, said collision element may also be realized at different locations and over different lengths of partial extent of the guide track. In this way, the location and the time at which the first energy absorption process, in the form of the deformation of the bending bracket, is assisted by means of the second energy absorption process with the collision element can be adjusted in targeted fashion. Furthermore, there are also a variety of ways in which the collision element is designed and fastened in the energy absorption device.

In a first variant, the collision element is in the form of a separate component which is fastened, preferably in exchangeable fashion, on and/or in the rest of the energy absorption device, for example on a rail thereof. By way of a detachable fastening, an exchange of the collision element is also possible, for example in order to targetedly vary or adapt the intensity of the energy absorption action through the exchange of collision elements.

In other variants, it may be provided that the collision element is formed integrally on the bending bracket itself. In these variants, the collision element may for example form an elongation or a projection of the bending bracket. Yet further variants provide that the guide track is formed, for example as a slot, in a rail of the energy absorption device. The collision element may then be part of said rail or may be integrally formed thereon. If the rail has a slot as a guide track, the collision element may also be directly in the form of a corresponding formation of the walls, which delimit the slot, of the rail.

For the sake of completeness, it is also pointed out that the expression "bending bracket" is to be interpreted broadly. It may be purely a bending bracket, which is only deformed. It may however equally be a cracking and bending bracket, which is provided to not only bend but also crack.

In order, in a crash situation, to provide a predefined or defined release force at the start of the energy absorption or at the start of the deformation of the bending bracket, and/or also in order to provide the bending bracket in a defined or predefined starting position for a crash situation, it may be provided that the first fastening element, and/or the element which is moved concomitantly with said first fastening element along the guide track, is fitted, preferably jammed, into a starting position on the guide track. Said starting position is expediently situated either at the start or in the vicinity of the start of the guide track. Said starting position is expediently arranged spaced apart from the collision element along the guide track. In the case of the guide track being in the form of a slot, it may be provided that, in the starting position, the fastening element, or the element which is moved concomitantly with said fastening element along the guide track, is fitted, preferably jammed, between the walls that delimit the slot. On said walls which delimit the slot there may be provided protruding regions which serve for the fitting or jamming of the first fastening element, or the element which is moved concomitantly with said first fastening element along the guide track, in the starting position. It is clear that said fitting or jamming is a connection that is releasable in a crash situation. During the installation of the bending bracket, it may be provided that the first fastening element, or an element which is moved concomitantly with said first fastening element along the guide track, is firstly displaced along the guide track to such an extent that the first fastening element, or the element which is moved concomitantly with said first fastening element along the guide track, is fitted or jammed in the starting position. Expediently, calibration is performed here, that is to say a certain deformation of the walls of the slot, in particular of the protruding regions of the walls of the slot and/or of the first fastening element and/or of the element which is moved concomitantly along the guide track. In this way, it is also possible for a preload to be applied to the bending bracket, which preload can be used in targeted fashion to adjust the release force in a crash situation into desired ranges. As discussed further below, said starting position may also be set, for normal operation, by way of a shear bolt which is sheared off in a crash situation.

In addition to the energy absorption device itself, the invention also relates to a steering column for a motor vehicle, having a steering spindle which is mounted in a steering spindle bearing unit of the steering column so as to be rotatable about its steering spindle longitudinal axis, and having a support unit for the fastening of the steering spindle bearing unit in the motor vehicle. Here, a steering column according to the invention is characterized in that the steering column has at least one energy absorption device according to the invention, and the bending bracket is directly or indirectly fastened, by way of one of the fastening elements, to the steering spindle bearing unit as one of the components of the steering column, and, by way of the other of the fastening elements, to the support unit as the other of the components of the steering column. Here, the steering spindle bearing unit is that steering column component, serving for the mounting of the steering spindle, which, in a crash situation, is displaced together with the steering spindle relative to that steering column component, in the form of the support unit, which serves for the mounting of the steering spindle bearing unit. During said relative displacement of steering spindle bearing unit and support unit, deformation of the bending bracket results in a first form of energy absorption, and the interaction of the first fastening element, and/or of the element which is moved concomitantly with said first fastening element along the guide track, with the collision element results in an additional energy absorption if a correspondingly large amount of impact energy is introduced into the system and the bending bracket is deformed to a corresponding extent.

A method according to the invention for energy absorption in a steering column for a motor vehicle in a crash situation provides that, in an energy absorption device according to the invention, the first fastening element is, with deformation of the bending bracket, displaced along the guide track relative to the second fastening element, and, by interaction of the first fastening element and/or of the element, which is moved concomitantly with said first fastening element along the guide track, with the collision element, energy is additionally absorbed by deformation of the collision element and/or of the first fastening element and/or of the concomitantly moved element. As already discussed, it is expediently provided here that the bending bracket is deformed first, and an interaction between the first fastening element, or the element which is moved concomitantly with said first fastening element, and the collision element occurs only subsequently. This is, however, not imperative. As stated, the expression "deformation" also encompasses a breakaway or tearing-away of corresponding elements. The statements regarding the energy absorption device otherwise apply to the steering column and to the method, where applicable.

BRIEF DESCRIPTION OF THE DRAWINGS

The present disclosure is described in detail below with reference to the attached drawing figures.

FIG. 1 is a side view of an example steering column with a first example of an energy absorption device.

FIG. 2 is a cross-sectional view of the example steering column of FIG. 1 taken across line AA.

FIG. 3 is an oblique view of the example steering column of FIG. 1.

FIG. 4 is an oblique view of an example steering spindle bearing unit and the energy absorption device from the example steering column of FIG. 1.

FIG. 8 is a side perspective view of a second example of an energy absorption device.

FIG. 9 is a side view of a third example of an energy absorption device in a pre-calibration position.

FIG. 10 is a side view of a third example of an energy absorption device in a post-calibration position.

FIG. 11 is a side view of a third example of an energy absorption device showing an example bending bracket that has been partially deformed.

FIG. 12 is a side view of a third example of an energy absorption device showing an example bending bracket that has been further deformed beyond the partial deformation shown in FIG. 11.

DETAILED DESCRIPTION

The following description of example methods and apparatus is not intended to limit the scope of the description to the precise form or forms detailed herein. Instead the following description is intended to be illustrative so that others may follow its teachings.

Figure 5:
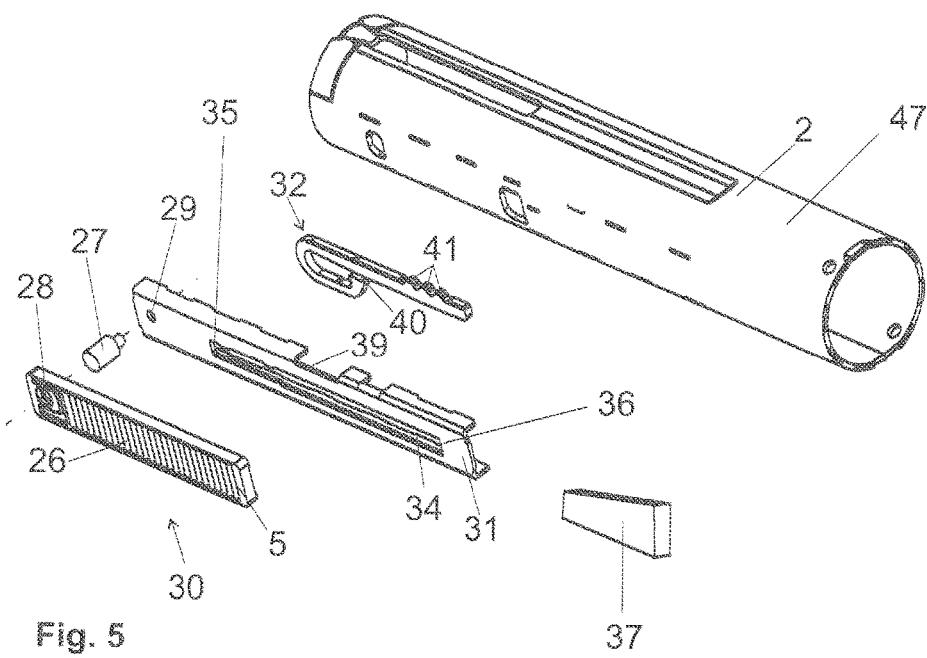
FIG. 5 is an exploded perspective view of the example energy absorption device of FIG. 4.
Figure 6:
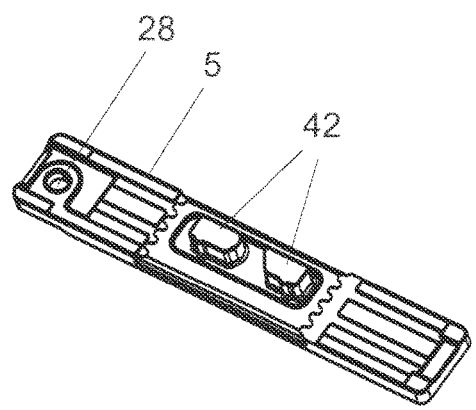
FIG. 6 is a perspective view showing an example retaining part from the example energy absorption device of FIG. 4.
Figure 7:
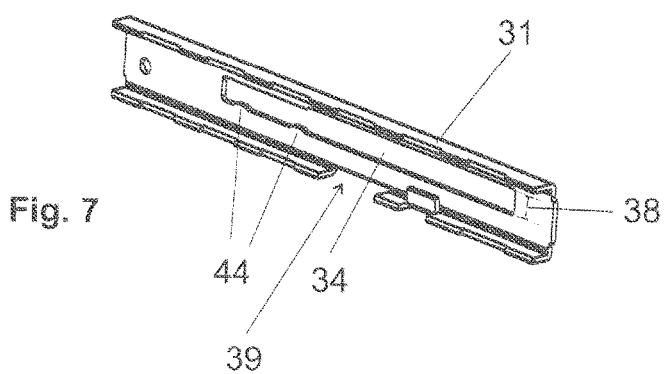
FIG. 7 is a perspective view showing an example rail from the example energy absorption device of FIG. 4.

Further features and details of preferred embodiments of the invention will be discussed on the basis of the following description of the figures, in which:

FIG. 1 shows a side view of a steering column according to the invention with a first type of energy absorption device according to the invention;

FIG. 2 shows the section from FIG. 1 along the line AA;

FIG. 3 shows an oblique view of the steering column from FIG. 1;

FIG. 4 shows an oblique view of the steering spindle bearing unit of the steering column from FIG. 1 with the energy absorption device according to the invention;

FIG. 5 shows the energy absorption device from FIG. 4 in an exploded illustration;

FIGS. 6 and 7 show the retaining part and the rail of said first exemplary embodiment of the energy absorption device;

FIG. 8 shows a second energy absorption device designed according to the invention, and FIGS. 9 to 12 show a third energy absorption device designed according to the invention, in different positions.

The steering column 33 illustrated in FIGS. 1 to 3 comprises a steering spindle bearing unit 2, which serves for mounting a steering spindle 1 so as to be rotatable about the steering spindle longitudinal axis 4 of the steering spindle 1, said steering spindle having a steering wheel-side end 3 which serves for the attachment of a steering wheel (not illustrated in the figures). The steering spindle bearing unit 2 is connected, by way of a breakaway connection described in more detail further below and an energy absorption device 30 according to the invention, to a retaining part 5. Up to a threshold value of a force acting between the steering spindle bearing unit 2 and the retaining part 5 parallel to the steering spindle longitudinal axis 4, the retaining part 5 is connected to the steering spindle bearing unit 2 non-displaceably in relation to the direction of the steering spindle longitudinal axis 4. Here, the threshold values for both directions parallel to the steering spindle longitudinal axis 4 may be equal or may differ, and can be set during the construction of the system.

A force F exerted on the steering spindle bearing unit 2 in a crash situation as a result of the collision between the vehicle driver and the steering wheel (or the corresponding force component parallel to the steering spindle longitudinal axis 4) points toward the front of the vehicle, as indicated in FIG. 1, and is correspondingly absorbed by an opposing force on the support unit 6.

In the operational state of the steering column 33, a support unit 6 which bears the steering spindle bearing unit 2 is connected rigidly to the chassis of the motor vehicle. In the open state of a locking device 7, the steering column 33 can be adjusted in length and height or tilt. Here, the steering spindle bearing unit 2 is adjustable relative to the support unit 6 parallel to the steering spindle longitudinal axis 4 (=length adjustment direction 8) and relative to the support unit 6 in a height or tilt adjustment direction 9 at right angles to said steering spindle longitudinal axis. In the closed state of the locking device 7, a locking force is imparted for locking the steering spindle bearing unit 2 with regard to a displacement relative to the support unit 6 parallel to the steering spindle longitudinal axis 4, wherein the locking force is higher, at least with regard to a displacement parallel to the steering spindle longitudinal axis 4 in the direction of the front of the vehicle, than the force threshold value up to which the steering spindle bearing unit 2 is held non-displaceably relative to the retaining part 5. Furthermore, the locking device 7 imparts a locking force for locking the steering spindle bearing unit 2 with regard to an adjustment relative to the support unit 6 in the height or tilt adjustment direction 9.

In the exemplary embodiment shown, the steering spindle bearing unit 2 is arranged between side cheeks 10, 11 of the support unit 6. Also situated between the side cheeks 10, 11 of the support unit 6 and the steering spindle bearing unit 2 are side legs 12, 13 of an intermediate unit 14, which surrounds the steering spindle bearing unit 2 at least over a major part of the circumference thereof. The intermediate unit 14 is, in the open state of the locking device 7, adjustable relative to the support unit 6 in the height or tilt adjustment direction 9. For this purpose, said intermediate unit is pivotable relative to the support unit 6 about a pivot spindle 15. The intermediate unit 14 is connected to the support unit 6 non-displaceably in relation to the direction of the steering spindle longitudinal axis 4, for example (also) by way of the design of said pivot spindle 15. In the open state of the locking device 7, the steering spindle bearing unit 2 is displaceable, parallel to the steering spindle longitudinal axis 4, relative to the intermediate unit 14 which displaceably guides the steering spindle bearing unit 2, and in the closed state of the locking device 7, said steering spindle bearing unit is held non-displaceably relative to the intermediate unit 14 in the direction of the steering spindle longitudinal axis 4 by the locking force imparted by the locking device 7.

The locking device 7 comprises a clamping bolt 16 which extends at right angles to the steering spindle longitudinal axis 4 and which extends through openings 17, 18 (cf. FIG. 2) in the side cheeks 10, 11, which openings are in the form of slots which run in the direction of the height or tilt adjustment 9 and in which the clamping bolt 16 is displaced during the height or tilt adjustment of the steering column 33. The edges of said openings 17, 18 hold the clamping bolt 16 non-displaceably relative to the support unit 6 in the direction of the steering spindle longitudinal axis 4. The clamping bolt 16 furthermore extends through openings in the side legs 12, 13 of the intermediate unit 11, the diameter of which openings corresponds, aside from a degree of play, to that of the clamping bolt 16.

On the clamping bolt 16, to both sides of the side cheeks 10, 11 of the support unit 6, there are arranged locking parts 19, 20, through openings of which the clamping bolt 16 extends and which are displaceable axially in the direction of the axis of the clamping bolt 16. One locking part 19 has a section in which it is extended through by the clamping bolt 16 and a section 22 which is connected to the former section by a connecting section 21 and in which said locking part interacts, as described further below, with the retaining part 5. The locking part 20 and the locking part 19, in the region of its section which is extended through by the clamping bolt 16, are, in the closed state of the locking device, pressed against the side cheeks 10, 11 of the support unit 6 in order to lock the adjustment of the steering column 33 in the height and tilt adjustment directions 9. Said locking may be realized by frictional engagement. Elements which interact in positively engaging fashion, for example toothings, may also be provided.

For the bracing of the locking parts 19, 20 against the side cheeks 10, 11 and of the locking part 19 against the retaining part 5, the locking device 7 may be designed in the conventional manner. For example, a locking lever 23 which serves for the opening and closing of the locking device 7 is connected to a cam disc 24 which is driven along by said clamping lever during a rotation about the axis of the clamping bolt 16 and interacts with a slotted-guide plate. The slotted-guide plate is in this case formed integrally with the locking part 19, though a separate slotted-guide plate could also be provided. Arrangements with rolling bodies or some other form of clamping mechanisms may also be used.

The section 22 of the locking part 19 extends through an opening in the side cheek 10 (the side cheek 10 could also end above the section 22 of the locking part 19) and through an opening in the side leg 12 of the intermediate unit 14. In the closed state of the locking device, the section 22 is pressed, by way of a toothing 25 arranged thereon, against a toothing 26 of the retaining part 5. Depending on the length setting of the steering column, the toothings 25, 26 come into contact with one another in different positions.

The section 22 of the locking part 19, which section is situated entirely on one side of the clamping bolt 16, is held non-displaceably, so as to be prevented from being displaced relative to the support unit 6 in a direction parallel to the longitudinal axis 4, by the edges of the opening extended through in the side cheek 10 and/or by the edges of the opening extended through in the side leg 12 of the intermediate unit 14.

Through the interaction of the toothing 25 of the section 22 with the toothing 26 of the retaining part 5, the retaining part 5 is, in the closed state of the locking device 7, locked so as to be prevented from being displaced relative to the locking part 19 in the direction of the steering spindle longitudinal axis 4. If said two toothings come into contact with one another in a tooth-on-tooth position during the closing of the locking device 7, it is the case at least after a slight initial displacement (which is smaller than the tooth spacing of the toothing) that a further displacement of the retaining part 5 relative to the locking part 19 is blocked.

Other positively engaging connections between the locking part 19 and the retaining part 5 are also possible, for example by way of bolts that engage into holes.

In the open state of the locking device 7, the locking part 19 is withdrawn from the retaining part 5 and said two parts are disengaged from one another, wherein the steering spindle bearing unit 2 is adjustable together with the retaining part 5 in the length adjustment direction 8.

The above-described elements of the steering column 33, aside from the design of the connection between the steering spindle bearing unit 2 and the retaining part 5, which will be described in more detail below, may be designed in a variety of ways that are known from the previously known prior art.

The retaining part 5 is guided displaceably relative to the steering spindle bearing unit 2 parallel to the steering spindle longitudinal axis 4 and is connected to the steering spindle bearing unit 2 firstly by way of a breakaway connection and secondly by way of the energy absorption device 30. The breakaway connection may be realized for example by way of a shear bolt 27. In the exemplary embodiment shown, the shear bolt 27 is inserted, at one side, into an opening 28 in the retaining part 5 and, at the other side, into an opening 29 (cf. FIG. 5). In this exemplary embodiment, the steering spindle bearing unit 2 comprises a casing tube 47. The rail 31, which is connected rigidly to said casing tube, for example by way of a welded connection, and which extends in the direction of the steering spindle longitudinal axis 4 and which has a U-shaped cross section, is part of the energy absorption device 30. The opening 29 is in this case formed in the rail 31.

The bending bracket 32, as part of the energy absorption device 30, is connected both to the retaining part 5 and to the steering spindle bearing unit 2. In the exemplary embodiment shown, the bending bracket 32 is of U-shaped form, with one limb of the U shape being connected to the retaining part 5 and the other limb of the U shape being connected by way of the rail 31 to the steering spindle bearing unit 2. It is preferable for both limbs of the U shape to extend at least substantially parallel to the steering spindle longitudinal axis 4.

The construction of the energy absorption device 30 in this first exemplary embodiment can be seen particularly clearly when viewing the side view in FIG. 4, the exploded illustration in FIG. 5, and FIGS. 6 and 7 together. FIG. 6 shows the rear side (not illustrated in FIG. 5) of the retaining part 5, and FIG. 7 shows the rail 31 from the inside. As already discussed, the rail 31 of the energy absorption device 30 shown here is arranged fixedly on the casing tube 47 of the steering spindle bearing unit 2. The guide track 34 is formed in the manner of a slot in the rail 31. The start 35 and the end 36 of the slot or of the guide track 34 are shown. In this exemplary embodiment, the bending bracket 32 has, as a first fastening element 40, a dovetail-like end which is held between the elements 42 on the rear side of the retaining part 5. The connection between the elements 42 and the first fastening element 40 of the bending bracket 32 is designed such that the elements 42 are moved concomitantly with the first fastening element 40 during a displacement of the first fastening element 40 along the guide track 34. Therefore, where reference is made to the elements 42, this also refers to the elements moved concomitantly with the first fastening element 40. When the locking device 7 is closed, the retaining part 5 is, as already discussed, held non-displaceably on the support unit 6 in the direction of the steering spindle longitudinal axis 4 by way of the engagement of the toothings 25 and 26. In this way, the first fastening element 40 is fixed to the support unit 6 by way of the retaining part 5 when the locking device 7 is closed. Situated at the other end of the bending bracket 32 is the second fastening element 41, in this case in the form of three projections which are fixedly held in the recess 39 of the rail 31. Said second fastening element 41 is thus fixed by way of the rail 31 to the casing tube 47 or to the steering spindle bearing unit 2. Now, if the vehicle driver is flung against the steering wheel and thus against the steering spindle bearing unit 2 in a crash situation, it is the case, if the locking device 7 is closed, that the steering spindle bearing unit 2 together with steering spindle 1 is displaced relative to the support unit 6, in a direction parallel to the steering spindle longitudinal axis 4, in the direction of the front wheels of the vehicle. By way of the fastening, already discussed, of the first fastening element 40 to the support unit 6 by way of the retaining part 5, a displacement of the first fastening element 40 and of the concomitantly moved elements 42 along the guide track 34 in the direction of the end 36 thereof occurs here. The deformation of the bending bracket 32 that takes place here results in the targeted absorption or targeted dissipation of the impact energy imparted to the steering spindle bearing unit 2. This is known per se, as is the breakaway of the shear bolt 27, which connects the two openings 28 and 29 to one another, at the start of the displacement of the retaining part 5 relative to the rail 31. In this context, it is pointed out that the shear bolt 27 may be provided in the preferred embodiments specified below. Energy absorption devices 30 according to the invention are however also possible in which the shear bolt 27 is dispensed with entirely.

If the energy absorption realized by deformation of the bending bracket 32 is not sufficient, for example because a particularly heavy driver is flung against the steering wheel, the energy absorption device 30 provides, as an additional energy absorption mechanism, the collision element 37 which is arranged on the guide track 34. In a crash situation, by means of interaction of the first fastening element 40, or of the element 42 which is moved concomitantly with said first fastening element along the guide track 34, with the collision element 37, which preferably maintains its position along the guide track 34, energy is additionally absorbed by deformation of the collision element 37 and/or of the first fastening element 40 and/or of the concomitantly moved element 42. In order that said additional energy absorption takes place not abruptly but with slowly increasing intensity along the guide track 34, preferred embodiments, such as the exemplary embodiments shown here, provide that the collision element 37 is designed to vary the intensity of the energy absorption along the partial extent 43. In the exemplary embodiments shown here, for this purpose the collision element 37 is in each case of wedge-shaped form or has at least one wedge-shaped region. It is also preferable, as stated, for the collision element 37 to extend along a partial extent 43 of the guide track 34. This can also be clearly seen in the exemplary embodiments shown here.

Through the configuration of the form of the collision element 37 and through the corresponding selection of the position of said collision element along the guide track 34, it is possible, in targeted fashion, to control when and with what intensity said additional energy absorption process realized by way of the collision element 37 is intended to act. The same also applies to the length of the partial extent 43 over which the collision element 37, if required, provides corresponding additional energy absorption. The intensity of the additional energy absorption realized by the collision element 37 expediently increases along the partial extent 43 in the direction of the end 36 of the guide track 34. This is realized here by way of the corresponding embodiment of the wedge-shaped collision elements 37. As can be seen particularly clearly in FIG. 4, it is the case in preferred embodiments that the collision element 37, by way of its wedge-shaped region, reduces the opening width 38 of the slot, which forms the guide track 34, to be passed through by the first fastening element 40 and/or the concomitantly moved element 42. It is basically pointed out that the collision element 37 may be arranged at virtually any desired location between the start 35 and the end 36 of the guide track 34. However, if, in preferred embodiments, it is the intention for the energy absorption by deformation of the bending bracket 32 to act first, preferred embodiments, like that realized here, provide that the partial extent 43 over which the collision element 37 acts is arranged in the region of that half of the guide track 34 which faces toward the end

36. The collision element 37 may basically be arranged before the end 36 of the guide track 34. Said collision element may however also extend as far as the end 36 of the guide track.

In all of the embodiments shown here, the studs, which form the concomitantly moved elements 42, on the retaining part 5, which studs hold the first fastening element 40 of the bending bracket 32, extend through the slot which forms the guide track 34. In the exemplary embodiments shown, it is also said concomitantly moved elements 42 which interact with the collision element 37 for energy absorption purposes. It is however self-evidently also possible, by contrast to the exemplary embodiments shown here, for the first fastening element 40 of the bending bracket 32 to be designed so as to interact directly with the collision element 37 when the bending bracket 32 has been deformed to a corresponding extent. It is also clear that the collision element 37 does not imperatively need to be arranged in the opening plane of the slot or of the guide track 34 in order to effectively reduce or narrow the opening width 38. In particular, if the first fastening element 40 and/or the concomitantly moved elements 42 protrude out of said opening plane, the collision element 37 does not have to be arranged in said opening plane for this purpose.

In the first exemplary embodiment as per FIGS. 4 to 7, the collision element 37 is in the form of a separate component which can be fixed to the rail 31, and thus to the guide track 34, at the desired location. It may even be provided that collision elements 37 of different length and/or different design can be correspondingly exchangeably fastened to the guide track 34. Possible fastening types are clip connections, screw connections, rivet connections and the like, or else cohesive fastening types such as welding, adhesive bonding and the like, if no exchange of the collision element 37 is desired.

By contrast to the first exemplary embodiment discussed above, it is provided, in the alternative embodiment of an energy absorption device 30 according to the invention as per FIG. 8, that the collision element 37 is formed not as a separate component but as part of the bending bracket 32 itself. In said design variant, it is the case, as can be clearly seen in FIG. 8, that the collision element 37 is a wedge-shaped projection of the bending bracket 32. Said second exemplary embodiment as per FIG. 8 otherwise functions in the same way as the first exemplary embodiment, such that no further explanations are necessary here. The second exemplary embodiment as per FIG. 8, and also the third exemplary embodiment as per FIGS. 9 to 12, of an energy absorption device 30 according to the invention may be correspondingly used in the steering column 33 as per FIGS. 1 to 3, or self-evidently also in steering columns 33 of some other design, instead of the first exemplary embodiment as per FIGS. 4 to 7.

In the case of the third exemplary embodiment of an energy absorption device 30 according to the invention as per FIGS. 9 to 12, the collision element 37 is formed as a fixed part of the rail 31. Said collision element is a bent-over bracket of the rail 31, which is in turn of wedge-shaped form and which gradually reduces the opening width 38 of the guide track 34, which in this case too is in the form of a slot, in the direction of the end 36 of the guide track 34 over the partial extent 43, without said collision element being arranged directly in the opening plane of the slot. The interaction of said collision element 37 with one of the concomitantly moved elements 42 can in this case be clearly seen in FIGS. 11 and 12. In FIG. 11, the bending bracket 32 has already been deformed, with displacement of the first fastening element 40 and of the concomitantly moved elements 42 along the guide track 34, to such an extent that one of the concomitantly moved elements 42 has struck the collision element 37. During a further displacement of the steering spindle bearing unit 2 relative to the support unit 6 and thus of the rail 31 relative to the retaining part 5, it is then the case that the front concomitantly moved element 42 interacts with the collision element 37 such that, by deformation of the collision element 37 and/or of the concomitantly moved element 42, an additional absorption of the impact energy introduced into the steering spindle bearing unit 2 in a crash situation is realized. In this way, the smoothest possible braking action is attained, and a hard abutment of the concomitantly moved element 42 against the end 36 of the guide track 34 is prevented at the end 36 of the guide track 34.

It has already been pointed out in the introduction that it is expedient if, in order to predefine a defined release force at the start of the crash situation and/or even merely to improve the defined positioning of the components relative to one another before the crash situation, the first fastening element 40 of the bending bracket 32 or at least one of the elements 42 moved concomitantly therewith is held in fitted, preferably jammed fashion on the guide track 34 in a starting position. To achieve this, a type of calibration may be performed during the assembly process, as will be discussed by way of example below on the basis of FIGS. 9 and 10. Even though this explanation is given on the basis of the third exemplary embodiment of the energy absorption device 30, it is nevertheless pointed out that said type of calibration is also realized in the same manner in the first two exemplary embodiments of the energy absorption device 30 discussed above, as can be clearly seen from the protruding regions 44 of the walls, which delimit the slot, in FIG. 7.

It is also the case in the third exemplary embodiment that the walls, which delimit the slot 34, of the rail 31 have corresponding protruding regions 44 provided therein. FIG. 9 shows the position before the calibration. From said position, during the course of the assembly of the energy absorption device 30, it may be provided that the first fastening element 40, with its concomitantly moved elements 42, is displaced on the displacement path 46 along the guide track 34 to such an extent that the concomitantly moved elements 42, or in other exemplary embodiments, the first fastening element 40 directly, are jammed between the walls of the slot, in this case in the region of the protruding regions 44. In the exemplary embodiments shown, the lugs 45 are provided on the concomitantly moved elements 42 for this purpose. A different design may however also be provided. In any case, said calibration process results in the concomitantly moved elements 42, and thus also the first fastening element 40, being fitted or jammed in the starting position as per FIG. 10, whereby a defined or predefined release force, and also the stated defined relative positioning between the components, can be achieved. To maintain said starting position, it may be provided, in the manner also realized here, that said position is secured by means of the shear bolt 27. During the displacement along the displacement travel 46, it is the case in the exemplary embodiments shown here that the openings 28 and 29 in the retaining part 5 and in the rail 31 overlap one another, such that then, the shear bolt 27 can be passed through said two openings 28, 29, as can be seen in FIG. 10. In other exemplary embodiments, it is however also possible for said securing action by way of shear bolts 27 to be dispensed with. If the shear bolt 27 is provided, it breaks away at the start of the crash process. The shear bolt 27 may also be utilized to arrest the bending bracket 32 in a position with a certain preload, as in WO 2011/072311 A1.

LIST OF REFERENCE NUMERALS

1 Steering spindle
2 Steering spindle bearing unit
3 Steering wheel-side end
4 Steering spindle longitudinal axis
5 Retaining part
6 Support unit
7 Locking device
8 Length adjustment direction
9 Height or tilt adjustment direction
10 Side cheek
11 Side cheek
12 Side leg
13 Side leg
14 Intermediate unit
15 Pivot spindle
16 Clamping bolt
17 Opening
18 Opening
19 Locking part
20 Locking part
21 Connecting section
22 Section
23 Clamping lever
24 Cam disc
25 Toothing
26 Toothing
27 Shear bolt
28 Opening
29 Opening
30 Energy absorption device
31 Rail
32 Bending bracket
33 Steering column
34 Guide track
35 Start
36 End
37 Collision element
38 Opening width
39 Recess
40 First fastening element
41 Second fastening element
42 Concomitantly moved element
43 Partial extent
44 Protruding region
45 Lug
46 Displacement travel
47 Casing tube

What is claimed is:

1. An energy absorption device for a steering column for a motor vehicle, the energy absorption device comprising:
    a rail having a guide track with a start and an end, the rail securable to and disposable alongside a steering spindle bearing unit of the steering column;
    at least one bending bracket for absorbing energy in a crash event, the bending bracket having a first fastening element for securing the bending bracket to a retaining part capable of being coupled to a support unit and a second fastening element for securing a different portion of the bending bracket to the rail, wherein the first fastening element and the retaining part are displaced relative to the second fastening element and the rail when the at least one bending bracket is deformed, wherein deformation of the at least one bending bracket occurs along the guide track of the rail; and
    at least one collision element arranged on the guide track and configured to interact with at least one of the first fastening element or the retaining part, wherein such interaction causes one or more of the at least one collision element, the first fastening element, or the retaining part to deform and absorb energy in a crash event.

2. The energy absorption device of claim 1 wherein the at least one collision element extends along a partial extent of the guide track.

3. The energy absorption device of claim 2 wherein one or more of the at least one collision element, the first fastening element, or the retaining part vary a degree of energy absorption along the partial extent of the guide track.

4. The energy absorption device of claim 1 wherein the guide track comprises a slot in the rail.

5. The energy absorption device of claim 4 wherein at least one of the first fastening element or the retaining part extends through the slot and is displaceable along the slot in a crash event.

6. The energy absorption device of claim 5 wherein the at least one collision element is positioned adjacent to the slot and is configured to interfere with at least one of the first fastening element or the retaining part extending through the slot if at least one of the first fastening element or the retaining part is displaced towards the end of the slot.

7. The energy absorption device of claim 1 wherein the at least one collision element comprises a wedge-shaped region.

8. The energy absorption device of claim 7 wherein the wedge-shaped region of the at least one collision element is positioned adjacent to the slot and is configured to interfere with at least one of the first fastening element or the retaining part extending through the slot if at least one of the first fastening element or the retaining part is displaced towards the end of the slot.

9. The energy absorption device of claim 1 wherein the at least one collision element is positioned between the start and the end of the guide track.

10. A steering column for a motor vehicle comprising:
    a steering spindle having a longitudinal axis, the steering spindle mounted in a steering spindle bearing unit and rotatable about the longitudinal axis;
    a support unit for securing the steering spindle bearing unit in the motor vehicle;
    a rail having a guide track with a start and an end, the rail secured to and disposed alongside the steering spindle bearing unit;
    at least one bending bracket for absorbing energy in a crash event, the bending bracket having a first fastening element for securing the bending bracket to a retaining part coupled to the support unit and a second fastening element for securing a different portion of the bending bracket to the rail secured to the steering spindle bearing unit, wherein the first fastening element and the retaining part are displaced relative to the second fastening element and the rail when the at least one bending bracket is deformed, wherein deformation of the at least one bending bracket occurs along the guide track of the rail; and
    at least one collision element arranged on the guide track and configured to interact with at least one of the first fastening element or the retaining part, wherein such interaction causes one or more of the at least one collision element, the first fastening element, or the retaining part to deform and absorb energy in a crash event.

\* \* \* \* \*